United States Patent Office 3,549,976
Patented Dec. 22, 1970

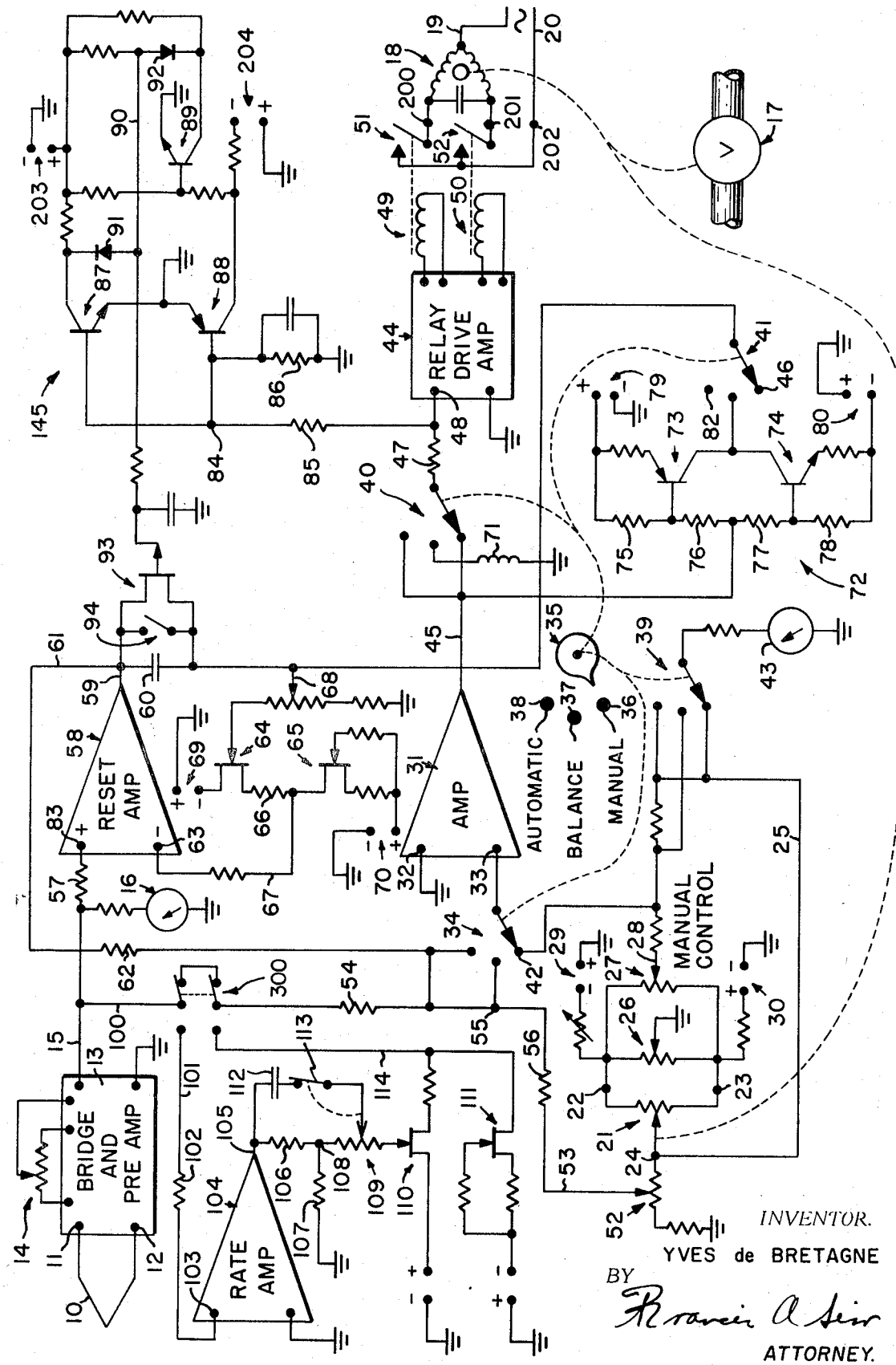

3,549,976
PROCESS CONTROLLER SELECTIVELY PROVIDING AUTOMATIC CONTROL WITH RESET OR MANUAL CONTROL
Yves de Bretagne, Minnneapolis, Minn., assignor to Honeywell Inc., Minneapolis, Minn., a corporation of Delaware
Filed Mar. 28, 1969, Ser. No. 811,459
Int. Cl. G05b 7/00, 11/42
U.S. Cl. 318—591                             10 Claims

ABSTRACT OF THE DISCLOSURE

A process controller to selectively provide automatic proportional control or manual control of a valve. Proportional control is in accordance with a thermocouple input signal and includes the features of automatic reset, reset lockout and rate. A three-position switch has manual, balance and automatic positions. In the balance position, a reset capacitor is charged to provide bumpless transition when switching from manual to automatic control.

---

The present invention is of particular utility in controllers which selectively provide automatic control or manual control of a controllable process variable such as temperature. If a controller has a reset or load compensation function, it is desirable to prevent the process element, such as a valve, from experiencing an abrupt adjustment when switching between manual and automatic control.

The present invention provides a three-position switch, one position being defined as a manual position, the second as a balance position, and the third as an automatic position. The balance position is physically located between the other two positions so that the switch must pass through the second position when switching between the manual and automatic positions. When the switch is in the balance position, the input of a proportional control amplifier is connected to sum an error signal, such as derived from a thermocouple set-point bridge, with a rebalancing followup signal, such as derived from a potentiometer whose wiper is controlled as the valve is controlled. Also, when the switch is in the balance position, the output of the control amplifier is connected to modify the reset signal and reduce the above mentioned summation to zero. Therefore, when the switch reaches the automatic position, the valve does not experience a bump; however, very soon thereafter the valve is controlled in accordance with the error signal.

Specifically, the above described structure includes a current generator connecting the control amplifier output to a reset capacitor when the switch is in the balance position. Other features include: an indicator which indicates the valve position by sensing the magnitude of the followup signal when the switch is in the automatic and manual positions, and indicates the difference between the manual control signal and the followup signal when the switch is in the balance position; a reset lockout amplifier to short the reset capacitor as a function of the magnitude of the error signal; and, a rate circuit to introduce a proportional and rate component to the input of the proportional control amplifier.

BRIEF DESCRIPTION OF THE DRAWING

The single figure is a circuit diagram disclosing the invention in combination with an input thermocouple and an output valve, and, including a switch which can be actuated to add a rate function.

DESCRIPTION OF THE PREFERRED EMBODIMENT

Summarizing the operation of the single figure, when knob 35 is in the automatic position, thermocouple 10 provides an error signal to amplifier 31 to control the position of valve 17. When knob 35 is in the manual position, valve 17 is controlled from manual control 28. In the automatic mode of operation, a reset function is provided by amplifier 58 and reset capacitor 60. When the error voltage reaches a given magnitude, reset lockout amplifier 145 causes capacitor 60 to be shunted to prevent reset windup. If a rate effect is additionally desired, switch 300 can be placed in its alternate position to utilize rate amplifier 104.

Thermocouple 10 is connected to the input terminals 11 and 12 of the controller. A bridge and pre-amplifier 13 is associated with the thermocouple and with a setpoint potentiometer 14. Setpoint potentiometer 14 is adjusted to the temperature which is to be established at an area wherein thermocouple 10 is located. The output error signal of bridge and pre-amplifier 13 exists at conductor 15. This output is a direct current voltage which is of one polarity upon a deviation of the temperature in one sense from the setpoint temperature, and is of the opposite polarity when the temperature deviates in an opposite sense from the setpoint temperature. A meter 16 is connected to conductor 15. Meter 16 deflects either direction from a zero rest position and indicates the magnitude of the error signal on conductor 15.

Valve 17 includes a motor 18 controlled by controller output terminals 200, 201 and 202. Motor 18 is adapted to be energized, as will be described, to rotate in either direction in accordance with the manner in which its windings are connected to alternating current supply conductors 19 and 20. Valve 17 controls the flow of a heating medium to the area wherein thermocouple 10 is located. The controller of the invention is adapted to provide proportional control of valve 17 in order to maintain the temperature of this area at the temperature set by setpoint potentiometer 14.

Motor 18 also controls the position of the wiper of a feedback potentiometer 21. The feedback potentiometer is a portion of the valve structure and is connected to terminals 22, 23 and 24 of the controller. A conductor 25 is connected to terminal 24 and provides a followup signal. The followup signal on conductor 25 is connected to a proportional band adjusting potentiometer 52 to provide a followup signal on conductor 53. Potentiometer 21 is associated with an electrical network including potentiometer 26 and potentiometer 27. Potentiometer 27 is a manual control potentiometer whose wiper is connected to conductor 28, this conductor providing a manual control signal. The resistance elements of potentiometers 21, 26 and 27 are connected in parallel to direct current voltage sources 29 and 30. The positive terminal of source 29 is connected to ground or reference potential and the negative terminal of source 30 is connected to reference potential.

The error signal present on conductor 15 is connected through resistor 57 to noninverting input 83 of reset amplifier 58. Output conductor 59 of this amplifier is effective to charge reset capacitor 60. The reset function is achieved by a circuit including capacitor 60 whose lower terminal is connected to the inverting input terminal 63 of amplifier 58 through a network including two field effect transistors 64 and 65. Transistor 65 is connected as a constant current source and resistor 66 is selected such that the voltage on conductor 67 is equal in magnitude and of the same polarity as the voltage present on conductor 68. Field effect transistors 64 and 65 are connected to direct current voltage sources 69 and 70. The positive terminal of source 69 is connected to reference potential, and the negative terminal of source 70 is connected to reference potential.

Terminal 55 is a summing terminal. The followup signal on conductor 53 is connected to this terminal through resistor 56. The error signal on conductor 15 is connected to terminal 55 through resistor 54. The reset signal on conductor 61 is connected to terminal 55 through resistor 62.

A proportional control amplifier 31 has one input terminal 32 connected to reference potential and has a second input terminal 33 connected to the movable blade of a three-position switch 34. Switch 34 constitutes a portion of a multiple switch having a first, a second and a third mode of operation which is controlled by a manual control knob 35. Knob 35 can be moved to a manual position 36, a balance position 37 or an automatic position 38. Switches 34, 39, 40 and 41 are controlled when knob 35 is moved.

Knob 35 is set at the manual position in FIG. 1. In this position switch 34 connects input terminal 33 of amplifier 31 to a stationary contact 42. This contact is connected to conductors 28 and 25 to sum the manual control signal and the followup signal.

Knob 35, and its various switches, are considered as first, second and third circuit means. The first circuit means is the manual position, the second circuit means is the balance position, and the third circuit means is the automatic position. Considering knob 35 in its manual position, the first circuit means accomplishes the following functions. Switch 34 connects conductors 25 and 28 to connect the followup signal and the manual control signal to the input of amplifier 31. Switch 39 connects an indicator, in the form of meter 43, to conductor 25. Meter 43 senses the magnitude of the followup signal on conductor 25 and indicates the position of valve 17. Switch 40 connects the input of relay drive amplifier 44 and the input of reset lockout amplifier 145 to output conductor 45 of amplifier 31. Switch 41 engages stationary contact 46 and performs no function at this time.

With the controller set to the manual mode of operation, movement of the wiper of manual control potentiometer 27 introduces an input signal to the input of amplifier 31. This input signal is of one polarity or the opposite polarity, depending upon the direction of movement of the wiper. Thus, the direct current output signal of amplifier 31, at conductor 45, may be of a positive or a negative polarity. This output signal is connected through resistor 47 to input terminal 48 of relay drive amplifier 44. Depending upon the polarity of this output signal, one of the relays 49 and 50 is energized to close its respective switch 51 or 52, causing the proper direction of rotation of motor 18 to move the wiper of followup potentiometer 21 in a direction to cause the summation of the followup signal and the manual control signal to be reduced to zero.

When the controller is operating in the manual mode, the relationship between the error signal on conductor 15 and the followup signal on conductor 25 is unknown.

As a result of the above described connections, the voltage present at terminal 55 is unknown when the controller is in the manual position. Also, with knob 35 in the manual position, the voltage at terminal 55 has no effect on the input of amplifier 31. The input of amplifier 31 is controlled from the manual control signal and the followup signal. As a result, an adjustment of manual control 27 is effective to quickly cause adjustment of valve 17 and followup potentiometer 21 in a manner to reduce the output signal of amplifier 31 to zero. Since the output of amplifier 31 is normally zero, reset lockout amplifier 145 is not effective to short reset capacitor 60.

In order to switch from manual to automatic control, knob 35 is first moved to the balance position wherein the second circuit means accomplishes the following functions. Switch 34 in the balance position connects input terminal 33 of amplifier 31 to terminal 55. Thus, the input signal to amplifier 31 consists of the summation of the error signal as provided by conductor 15, the followup signal as provided by conductor 53, and the reset signal as provided by conductor 61. With switch 39 in the balance position, meter 43 is connected to measure the summation of the manual control signal on conductor 28 and the followup signal on conductor 25. Switch 40 in the balance position connects the input of relay drive amplifier 44 and the input of reset lockout amplifier 145 to reference potential through resistor 71. Switch 41 in the balance position connects the output 45 of amplifier 31 through current generator 72 to reset capacitor 60. Current generator 72 includes a pair of transistors 73 and 74 which are associated with a voltage divider consisting of resistors 75, 76, 77 and 78. The voltage divider is connected to direct current voltage sources 79 and 80. The negative terminal of source 79 is connected to reference potential whereas the positive terminal of source 80 is connected to reference potential.

With knob 35 is its second or balance mode of operation, amplifier 31 is effective to amplify the summation of the error signal on conductor 15, the followup signal on conductor 53 and the reset signal on conductor 61 and to control current generator 72 in accordance with this summation to charge capacitor 60 in a manner to reduce this summation, at terminal 55, to zero. This effect occurs quickly and it is not necessary to allow knob 35 to dwell in the balance position for an appreciable length of time. Since the voltage at terminal 55 is thereby made equal to zero, a bumpless transition takes place as knob 35 is moved from the manual to the automatic mode of operation.

When knob 35 is moved to its third or automatic position, the third circuit means accomplishes the following functions. Switch 34 in the automatic position again connects input terminal 33 of amplifier 31 to terminal 55. As above mentioned, the voltage at terminal 55 is now substantially zero. Switch 39 in its third position is again effective to connect meter 43 to conductor 25. Thus, meter 43 indicates the position of valve 17, as it did in the first position of switch 39. Switch 40 in its third position against connects the input of relay drive amplifier 44 and the input of reset lockout amplifier 145 to output 45 of amplifier 31, as it did in the first position of switch 40. Switch 41 in the third position connects to stationary contact 82 and accomplishes no function at this time.

At the instant that switch 34 is switched to its third or automatic position, the input to amplifier 31 is substantially zero. However, thereafter, any error voltage present on conductor 15 operates through reset amplifier 58 to originate an input voltage for amplifier 31 and valve 17 is controlled to produce the setpoint temperature at thermocouple 10. Also, reset amplifier 58 is effective to charge capacitor 60 to originate a reset voltage. This reset voltage is applied to the input of amplifier 31 by way of conductor 61.

If the error voltage at conductor 15 changes considerably, as by a considerable adjustment of setpoint potentiometer 14, reset lockout amplifier 145 prevents reset windup (excess charging of capacitor 60).

Input terminal 84 of amplifier 145 is connected through resistors 85 and 47 to output 45 of amplifier 31 whenever switch 40 is in its automatic or its manual position. When switch 40 is in its balance position, terminal 84 is connected to reference potential through resistors 85 and 71. When switch 40 is in its manual position, amplifier 145 is normally not actuated since valve 17 and followup potentiometer 21 quickly adjust in accordance with movement of manual control potentiometer 27.

However, when switch 40 is in its automatic position, the controller may at times operate with a large error signal. If this occurs, the output of amplifier 31 rises to a relatively high magnitude and this voltage is applied to input terminal 84 through resistors 47, 85 and 86.

Transistors 87, 88 and 89 are energized from direct current voltage sources 203 and 204 and are normally nonconductive. When the output of amplifier 31 increases to this high magnitude, one or the other of the transistors 87 or 88 will become conductive, depending upon the polarity of the output of amplifier 31. When transistor 87 becomes conductive, conductor 90 is connected to reference potential through diode 91 and the collector-to-emitter circuit of transistor 87. When transistor 88 becomes conductive, transistor 89 also becomes conductive and conductor 90 is connected to reference potential through diode 92 and the collector-to-emitter circuit of transistor 89. In either event, when conductor 90 is connected to reference potential, normally nonconductive field effect transistor 93 becomes conductive and shorts reset capacitor 60 to prevent charging of this capacitor.

A manual switch 94 is provided and can be closed to eliminate the reset function from the controller of FIG. 1, whereupon the controller operates as a proportional controller without reset or load compensation.

When changing from the automatic to the manual mode of operation, knob 35 is first moved from position 38 to position 37.

With switch 34 in the balance position, input 33 of amplifier 31 is connected to terminal 55, as it was with switch 34 in the automatic position. Switch 40 connects input 48 of relay drive amplifier 44 and input 84 of reset lockout amplifier 85 to reference potential through resistor 71. Switch 41 connects output 45 of amplifier 31 through current generator 72 to reset capacitor 60. Switch 39 connects meter 43 to indicate the summation of the followup signal on conductor 25 and the manual control signal on conductor 28. The wiper of manual control potentiometer 27 is now adjusted until meter 43 indicates that the sum of the manual control signal and the followup signal is substantially zero. Knob 35 is then moved to the manual position, providing bumpless transition between the automatic and manual modes of operation.

To add a rate function to the controller, it is necessary to actuate switch 300 to its alternate position. With switch 300 in this position, conductor 100 is connected to conductor 101 and through resistor 102 to input terminal 103 of rate amplifier 104. The rate output signal or rate amplifier 104, at conductor 105, is connected to reference potential through resistors 106 and 107. Terminal 108 is connected through the resistance element of rate adjustment potentiometer 109 to the gate electrode of field effect transistor 110. Field effect transistors 110 and 111 are connected in circuit similar to that above described in connection with field effect transistors 64 and 65 of FIG. 1. A rate capacitor 112 is connected from conductor 105 to the wiper of potentiometer 108. In order to increase the rate effect, the wiper of potentiometer 109 is moved in a downward direction. To decrease the rate effect, the wiper is moved in an upward direction. When a minimum rate position is reached, switch 113 opens to eliminate the rate effect from output conductor 114. When switch 113 is closed, the signal present on conductor 114 provides both proportional and rate control of valve 17. When switch 113 is open, the signal present on conductor 114 provides only proportional control of valve 17. Conductor 114 is connected through resistor 54 to terminal 55.

The embodiments of the invention in which an exclusive property or right is claimed are defined as follows:

1. In a process controller which is adapted to selectively provide automatic control with reset or manual control of a process element; the controller having, error means adapted to respond to the magnitude of a controllable process variable to produce an error signal representative of deviation of the variable from a setpoint, reset means controlled by the error signal to produce a reset signal, manual means to produce a manual control signal representative of desired manual control of the process element, first amplifier means having an input and having an output including means adapted to be connected to control the process element said first amplifier means including drive circuit means, and followup means adapted to produce a followup signal representative of the condition of the process element; the improvement comprising:

switch means having first, second and third modes of operation, said switch means being constructed and arranged such that the switch means must pass through the second mode of operation when switching between said first and third modes of operation, first circuit means including said switch means in said first mode of operation connecting said manual control signal to the input of said first amplifier means, said first circuit means connecting said first amplifier means output to said drive circuit means, second circuit means including said switch means in said second mode of operation connecting said error signal, said reset signal, and said followup signal to the input of said first amplifier means, and connecting the output of said first amplifier means to control said reset means, said second circuit means disconnecting said first amplifier means output from said drive circuit means, and third circuit means including said switch means in said third mode of operation connecting said error signal, said reset signal, and said followup signal to the input of said first amplifier means, said third circuit means connecting said first amplifier means output to said drive circuit means.

2. A controller as defined in claim 1 wherein said second means includes second amplifier means having an input controlled by said error signal and having an output including a capacitor connected to be charged to a voltage representative of reset, and wherein said second circuit means includes a current generator connecting the output of said first amplifier means to said capacitor to charge said capacitor in accordance with the summation of said error signal and said followup signal.

3. A controller as defined in claim 2 including reset lockout means having an input controlled in accordance with said first amplifier means output and having an output connected to short said capacitor upon said first amplifier means output reaching a given magnitude.

4. A controller as defined in claim 3 wherein said second circuit means disconnects said first amplifier means output from said reset lockout means input, and wherein said third circuit means connects said first amplifier means output to said reset lockout means input.

5. A controller as defined in claim 1 wherein said second and third circuit means includes rate means having an input controlled by said error signal and having an output connected to modify the error signal which is connected to the input of said first amplifier means to provide a rate signal component.

6. A controller as defined in claim 1 including reset lockout means having an input controlled in accordance with said first amplifier means output and having an output connected to said reset means to eliminate said reset signal upon said first amplifier means output reaching a given magnitude.

7. A controller as defined in claim 1 including indicating means, wherein said first and third circuit means connects said indicating means to indicate the magnitude of said followup signal, and wherein said second circuit means connects said indicating means to indicate the summation of said manual control signal and said followup signal.

8. A controller as defined in claim 1 wherein said reset means includes second amplifier means having an input connected to receive said error signal and having an output including a capacitor connected to be charged to a voltage indicative of reset, and wherein said second circuit means includes a current generator connecting the said first amplifier means output to said capacitor to charge said capacitor in accordance with the summation of said error signal and said followup signal.

9. A controller as defined in claim 8 including indicating means, wherein said first and third circuit means connects said indicating means to indicate the magnitude of said followup signal, and wherein said second circuit means connects said indicating means to indicate the summation of said manual control signal and said followup signal.

10. A controller as defined in claim 9 wherein said second and third circuit means includes rate means having an input controlled by said error signal and having an output connected to modify the error signal which is connected to the input of said first amplifier means to provide a rate signal component.

References Cited
UNITED STATES PATENTS

| | | | |
|---|---|---|---|
| 3,069,554 | 12/1962 | Decker et al. | 318—20.245X |
| 3,373,268 | 3/1968 | Hewlett, Jr. | 318—20.390X |
| 3,377,547 | 4/1968 | Ohlson | 318—20.395X |
| 3,422,457 | 1/1969 | Koppel | 318—20.245 |
| 3,441,836 | 4/1969 | Riley | 318—20.395X |

THOMAS E. LYNCH, Primary Examiner

U.S. Cl. X.R.

318—609, 610